United States Patent [19]

Perry et al.

[11] Patent Number: 4,564,937
[45] Date of Patent: Jan. 14, 1986

[54] REMOTE DATA LINK ADDRESS SEQUENCER AND A MEMORY ARRANGEMENT FOR ACCESSING AND STORING DIGITAL DATA

[75] Inventors: Thomas J. Perry, Phoenix; Muhammad Khera, Glendale, both of Ariz.

[73] Assignee: GTE Automatic Electric Incorporated, Northlake, Ill.

[21] Appl. No.: 564,136

[22] Filed: Dec. 22, 1983

[51] Int. Cl.⁴ .......................... H04J 1/10; H04J 3/08; H04J 3/16; H04Q 11/00
[52] U.S. Cl. ...................................... 370/58; 370/89; 370/66
[58] Field of Search ...................... 370/68, 66, 58, 85, 370/89; 365/230, 239, 240

[56] References Cited

U.S. PATENT DOCUMENTS

Re. 29,450 10/1977 Goldsby et al. ................... 365/239
3,956,593  5/1976 Collins et al. ......................... 370/66
4,309,765  1/1982 Müeller et al. ....................... 370/58

OTHER PUBLICATIONS

Hannaford, "Sequentially Addressed Storage", IBM Tech. Disclosure Bulletin, vol. 20, No. 2, Jul. 1977, pp. 732-733.

Primary Examiner—Douglas W. Olms
Assistant Examiner—Wellington Chin
Attorney, Agent, or Firm—Anthony Miologos; Peter Xiarhos

[57] ABSTRACT

An address sequencer and memory arrangement is shown for transferring data in the form of message bytes to and from a plurality of digital data links. The address sequencer and memory arrangement includes a memory circuit having a plurality of memory location areas associated with each of the plurality of digital data links. A counter circuit connected to the memory circuit is loaded with a preset count by a link processor complex. The counter increments and outputs to the memory circuit addresses which sequentially access each of the memory location areas, transferring each message byte to a data link output buffer for transmission over a respective one of the plurality of digital data links. Alternatively, the counter addresses sequentially each memory location area transferring a message byte to each memory location area from each of the plurality of digital data links via a data link input buffer.

9 Claims, 10 Drawing Figures

REMOTE DATA LINK ADDRESS SEQUENCER AND A MEMORY ARRANGEMENT FOR ACCESSING AND STORING DIGITAL DATA

CROSS-REFERENCE TO RELATED APPLICATIONS

The present application is related to the following co-pending U.S. patent applications all having the same inventive entity and being assigned to the same assignee:

Ser. No. 564,134, titled, "A Remote Data Link Controller;"

Ser. No. 564,138, now U.S. Pat. No. 4,516,237, titled, "A Remote Data Link Controller Having Multiple Data Link Handling Capabilities;"

Ser. No. 564,135, titled, "A Remote Data Link Receive Data Reformatter;"

Ser. No. 564,133, titled, "A Remote Data Link Transmit Data Formatter;"

Ser No. 564,137, titled, "A Data Format Arrangement for Communication Between the Peripheral Processors of a Telecommunications Switching Network."

BACKGROUND OF THE INVENTION

The present invention relates in general to data transmission between the switching systems of a telecommunications network and more particularly to an addressing and memory circuit for accessing and storing control data messages in a remote data link controller.

In modern digital telecommunication switching systems a concept of network modularity has been designed allowing the interconnection of small switching systems remote to a larger host system. These remote switching systems have capacities to handle between a few hundred and a few thousand telephone subscribers. The remote switching systems are normally used in areas where the installation of a large switching system would be uneconomical.

A high speed digital data link typically interfaces the host switching system to the remote system through which large amounts of voice and control data are exchanged. The voice data normally comprises subscriber calls switched through either the host or the remote system. The control data may be status exchanges between the host and the remote, i.e. centralized administration, billing and maintenance, or the direct control of the operation of the remote by the host.

The control data exchanges are originated in the sending system peripheral processor transmitted over the high speed digital data link to the receiving system peripheral processor where the data is interpreted. In order to relieve each peripheral processor from the burden of controlling the data link a remote data link controller is implemented in each system which performs all tasks involved in the formatting, transmission and reception of the control data.

The remote data link controllers are connected to each other via digital spans. The digital spans may be T1, T2 or T1C, T3 carriers using DS1, DS2 or DS1C, DS3 data formats, respectively. These digital spans transmit data at high speeds serially at a rate of approximately 1.5-45 megabits per second.

Typically, the transmitting peripheral processor outputs data words to the link controller where the data words are assembled or formatted into a data message or packet. The packet is then transmitted to the receiving link controller where the data message is reformatted back into data words readable by the receiving peripheral processor.

In cases where more than one remote switching system is connected to a host switching system a dedicated data link controller for each data link is normally required. Therefore, if 16 remote units are connected to a host then 16 link controllers would be required to control 16 data links.

It is more economically advantageous however, to be able to control all data links with only one controller. The multiple link remote data link controller would service each data link in a sequential fashion processing the control data for a set amount of time for each link before going on to the next. Formatted data messages are stored away in a temporary memory or scratch pad memory and at the appropriate time in the servicing sequence would be output to the link. Similarly, receive control messages are read into the scratch pad memory and at the appropriate time in the servicing sequence are transferred to the reformatting circuit of the controller for processing.

Accordingly, it is the object of the present invention, to provide an address sequencer and memory circuit for use in a multiple link remote data link controller.

SUMMARY OF THE INVENTION

In accomplishing the object of the present invention there is provided an address sequencer and memory arrangement used in a remote data link controller for transferring data in the form of message bytes to a plurality of digital data links. The remote data link controller includes a link processor complex for controlling the remote data link controller, a message byte formatter for assembling data words into message bytes and at least one data link output buffer connected to the plurality of digital data links.

The address sequencer and memory arrangement of the present invention includes a memory circuit having a plurality of defined memory location areas. Each memory location area is associated with one of the plurality of digital data links. The memory circuit is also connected to the message byte formatter and arranged to receive and store in each memory location from the message byte formatter a message byte.

A counter circuit connected to the memory circuit is arranged to have a preset count loaded into the counter circuit responsive to a start pulse from the link processor complex. After the initial loading, the counters begin incrementing. The counter output sequentially addresses the memory circuit, allowing each message byte stored in each memory location are to be transferred to the digital link output buffer. Each message byte is transmitted over a respective one of the plurality of digital data links.

The address sequencer and memory arrangement of the present invention is also arranged to transfer data in the form of message bytes from the digital data links to the memory circuit. As explained previously, the counter circuit is loaded with a preset count responsive to a start pulse from the link processor complex. As the counter increments it outputs to the memory circuit addresses which sequentially access each of the memory location areas. A data link input buffer writes a message byte in each memory location area from a respective one of the plurality of digital data links.

DESCRIPTION OF THE PREFERRED EMBODIMENT

Figure 1:
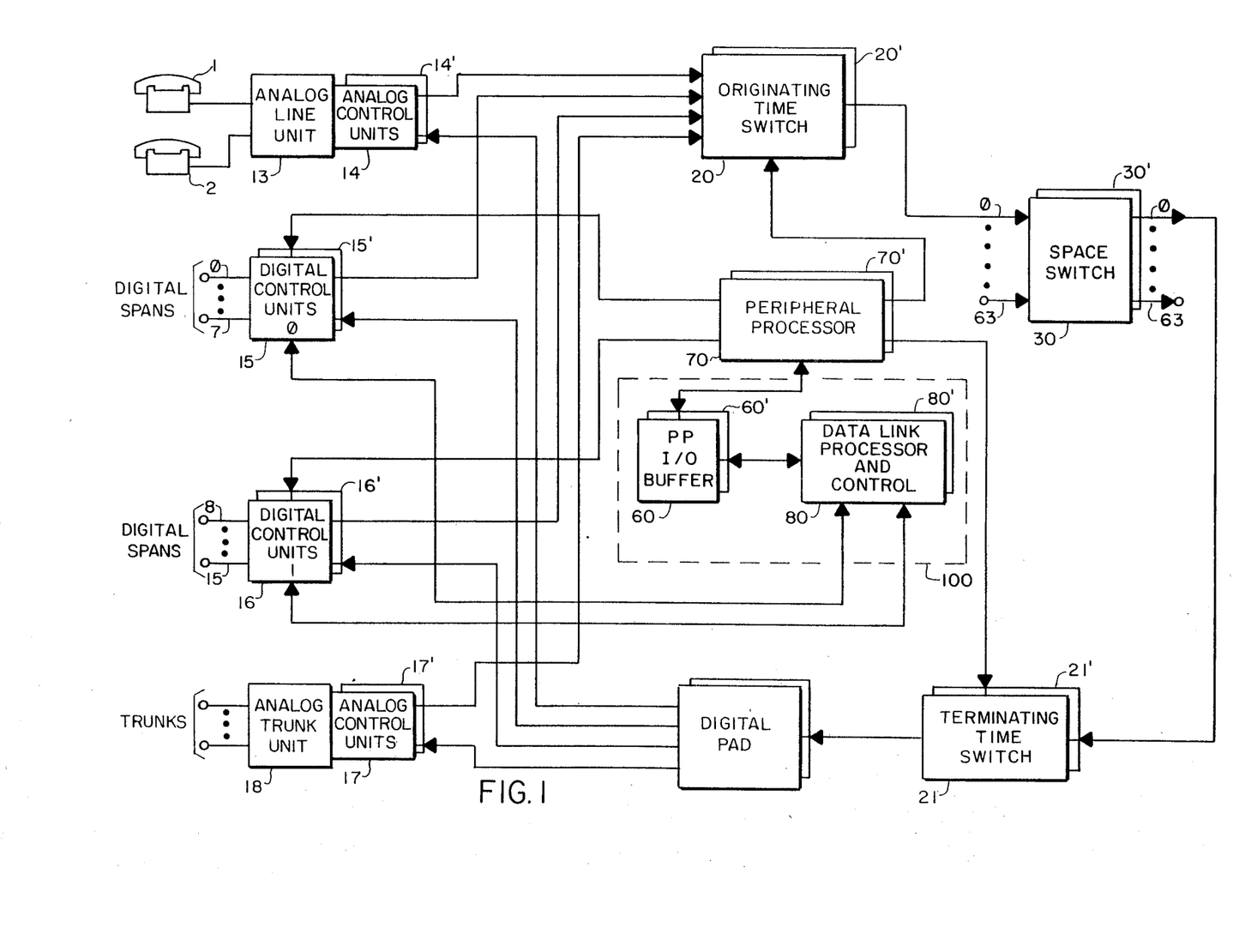
FIG. 1 is a block diagram of a telecommunications switching system embodying the present invention.

Referring to FIG. 1, a time-space-time digital switching system along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to a duplex pair of space switch units 30 and 30' which are in turn connected to a duplex pair of terminating time switches 21 and 21'. Terminating time switches 21 and 21' are connected to analog control units 14 and 14' and ultimately to the telephone subscribers 1 and 2 via analog line circuit 13. Digital control units 15, 15' and 16, 16' connect the digital spans to the switching system. Digital span equipment may be implemented using a model 9004 T1 digital span, manufactured by GTE Lenkurt, Inc. Similarly, analog trunk unit 18 connects trunk circuits to the digital switching system via analog control units 17 and 17'.

A peripheral processor CPU 70 controls the digital switching system and digital and analog control units. Analog line unit 13 and a duplex pair of analog control units 14 and 14' interface to telephone subscribers directly. A duplicate pair of digital control units 15, 15' and 16, 16' control the incoming PCM data from the digital spans. Similarly, the analog trunk unit 18 and a duplex pair of analog control units 17 and 17' interface to trunk circuits. The analog and digital control units are each duplicated for reliability purposes.

The network of FIG. 1 also includes a REMOTE DATA LINK CONTROLLER (RDLC) 100 which provides formatting and control of data transmitted and received between the peripheral processors of two or more switching systems. The RDLC can provide up to 16, 64 kilobits per second data links arranged for full duplex operation and is configured so that it can provide one full duplex data link for each of the 16 T1 spans. RDLC 100 can operate together with one or two digital control units (DCU), with each DCU capable of providing up to eight T1 carrier facilities.

RDLC 100 includes a duplicated data link processor and control 80 and 80' and a duplicated peripheral processor (PP) I/O buffer 60 and 60'.

Prior to examining the detailed operation of the RDLC 100, it is helpful to understand the format and protocol of the messages which are transmitted and received by the RDLC. Each message consists of eight, 8-bit bytes of data for a total of 64 bits. The peripheral processor I/O buffer provides four transmit message buffers and four receive message buffers for each of the 16 possible data links.

Normally, peripheral processor software writes a message into a transmit message buffer of PP I/O buffer 60 and 60' associated with a data link and then issues a transmit command to data link processor and control 80 and 80'. The data link processor and control 80 and 80' responds by taking the message out of the transmit message buffer, formatting the data so that it can be transmitted over a T1 carrier and then transmits the message to the distant end of the data link through the appropriate DCU and digital span.

When a message is received, the data link processor and control 80 and 80' reformats the received data and places the message into an appropriate receive message buffer in the PP I/O buffer 60 and 60'. Data link processor and control 80 and 80' then causes an interrupt, alerting peripheral processor 70 and 70' to the fact that a message has been received. The RDLC will queue up to three received messages for each data link. It should be noted that under normal conditions the RDLC functions in a duplex configuration, that is, it matches all outgoing signals performed in the DCUs. With this arrangement there is one RDLC circuit for each of the two copies of the DCUs.

Figure 2:
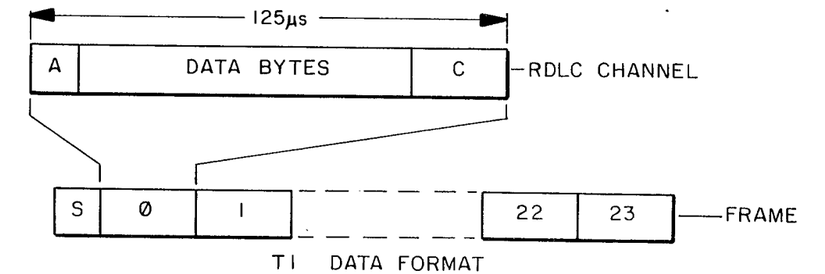
FIG. 2 is a bit map of a channel and frame for a T1 data span.

The nature of a T1 data and its format is shown in FIG. 2. Normally, each T1 span transmits and receives voice samples organized together into a frame. Each frame includes 24 voice samples with each voice sample associated with one channel of voice (or data). The channels are numbered 0–23. Normally, the RDLC will insert its data bytes in channel 0. The S bit carries a periodic pattern which, when detected, is used to identify the beginning of each frame of data.

Figure 3:
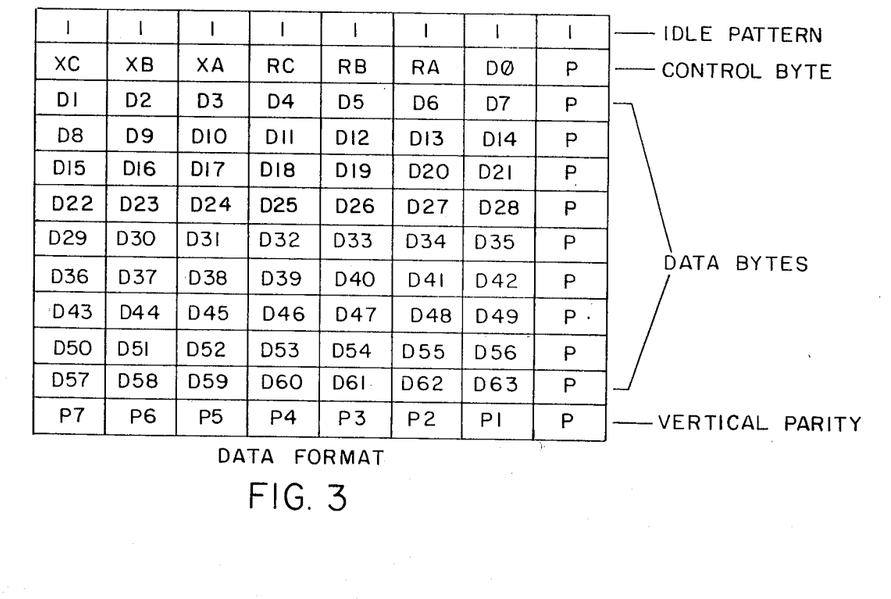
FIG. 3 is a bit map representation of a formatted data message used by the present invention.

Turning to FIG. 3, the complete data format for one message is shown. The data format is byte oriented with one 8-bit byte being transmitted during each T1 data frame for each data link. When the link is idle and not transmitting the transmitter sends idle patterns consisting of all ones. The beginning of a message is indicated by sending a control byte containing one or more zeros which may contain information conveying the sequence number of messages transmitted or received and/or acknowledgments between the RDLCs. As can be seen in FIG. 3 only six control bits are used (XC, XB, XA, RC, RB, RA) in the control byte. The first data bit to be transmitted is inserted in the bit 1 position of the control byte. The control byte further includes an odd parity bit in bit position 0. The next nine bytes contain the remaining 63 bits of data, each byte containing seven bits of data plus an odd parity bit. The final message byte contains seven vertical parity bits plus an odd parity bit for the vertical parity byte. Each vertical parity bit provides even parity for ten of the preceding bits, i.e. P1 for bit 1 in each of the preceding ten byes, P2 for bit 2, P3 for bit 3, etc. The next byte will contain idle pattern.

It should be noted that the idle pattern is unique in that it has even parity. This makes it easy for the receiver to synchronize with the incoming data stream and greatly reduces the chance that a receiver would accept an incorrect message because of improper synchronization.

Figure 4:
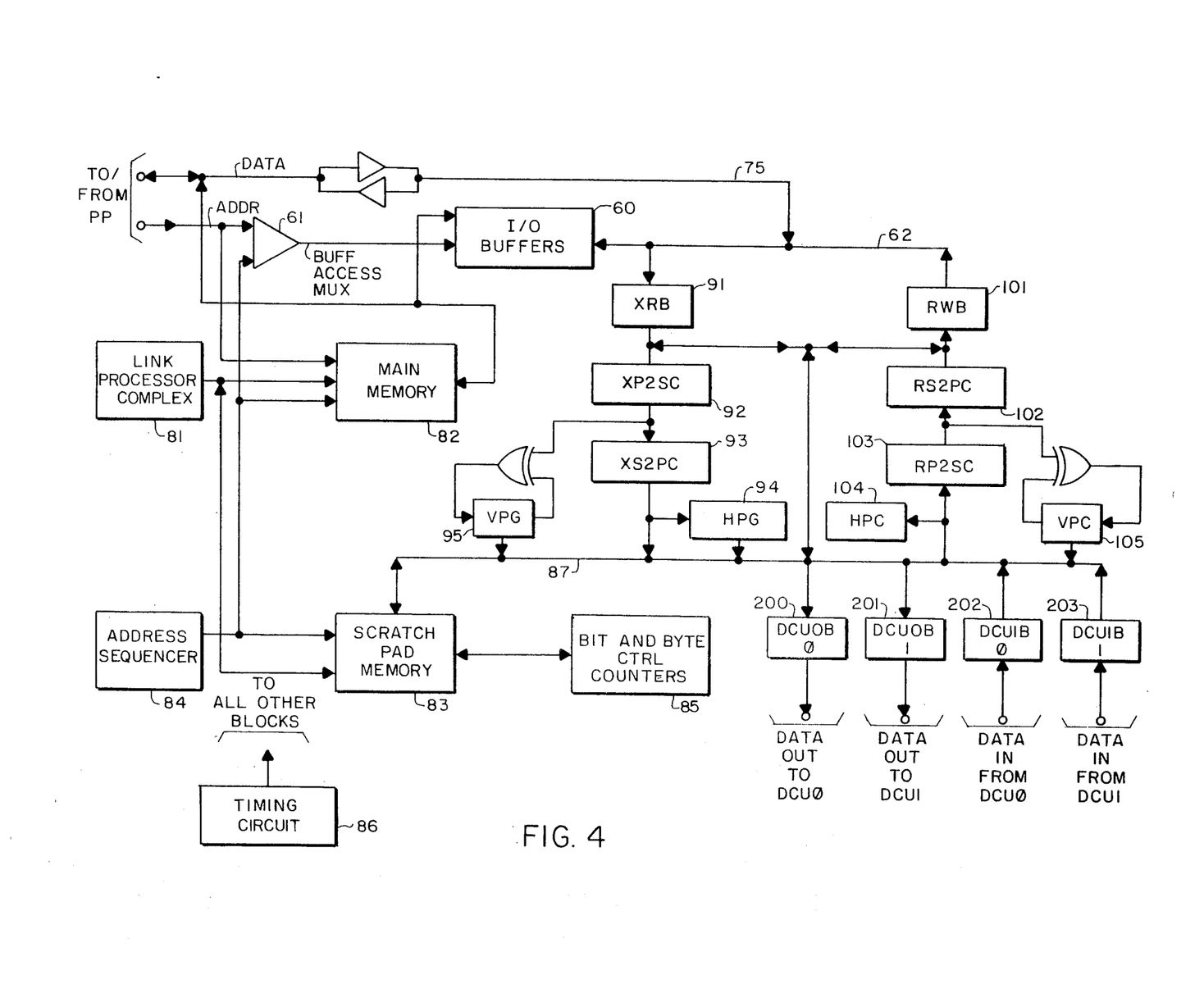
FIG. 4 is a detailed block diagram of the remote data link controller including the address sequencer and scratch pad memory of the present invention.

Turning now to FIG. 4, a block diagram of the Data Link Processor and control 80, 80' of RDLC 100 is shown. The link processor complex 81 includes an Intel 8085A microprocessor together with associated read only memory (ROM), address and data latches and timing and control circuitry. The processor under control of the program in ROM simply controls the operation of the RDLC. Main memory 82 is a 256×8 bipolar random access memory (RAM) arranged for shared access by the link processor complex 81, the peripheral processor (PP) and the address sequencer 84. The link processor complex 81 uses main memory 82 as its primary read/write memory. The PP uses it for a status and control function.

Both the PP and the address sequencer 84 do a prefetch of a 2-bit page address from the main memory 82 prior to accessing the I/O buffers 60. This page address is used to identify which of the four buffers associated with a single data link will actually be accessed during the I/O buffer access.

Buffer access multiplexers 61 are a set of multiplexers and tri-state drivers which allow the RDLC hardware to share access to the I/O buffers 60 with software access from the PP. The I/O buffers 60 are a 1K random access memory (RAM) containing the four transmit and the four receive message buffers for each of the 16 data links.

Intermediate data is stored in scratch pad memory 83 with which is addressed by counters in address sequencer 84. Address sequencer 84 also provides control hardware sequencing to the rest of the RDLC. Bit and byte control counters 85 determine which bit of which byte is actually being processed at any given instant by the transmit formatter and receive reformatter.

The transmit formatter comprises elements 91 through 95 and is the circuitry that takes the 8-bit bytes from the I/O buffer 60 transmit buffers and converts them to the 7-bit plus parity format that is transmitted. The receive reformatter elements 101 through 105 is the circuitry that takes the incoming data and converts it back into the 8-bit bytes placed into the receive buffers of I/O buffer 60.

The timing circuit 86 is a read only memory driven, finite state machine arranged to generate periodic signals used for timing and synchronization within the RDLC.

Figure 5:
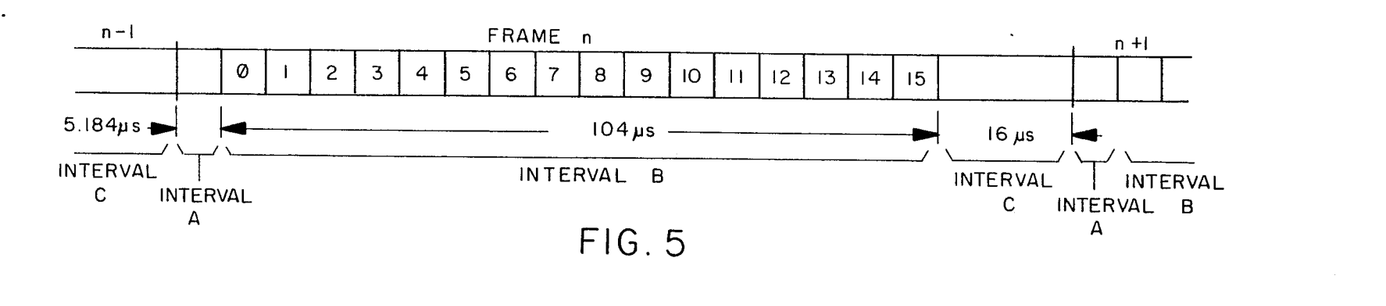
FIG. 5 is a detailed time utilization diagram of the remote data link channel shown in FIG. 2.

Turning now to FIG. 5, the overall timing that repeats for every frame is shown. As can be seen the frame is divided into three intervals. Interval A, interval B and interval C. During interval A, the RDLC devotes all resources to the task of transferring data to and from the DCUs. Data for all 16 data links is exchanged during this 5.184 microsecond interval. No processing of data occurs during this time, however the peripheral processor may access the I/O buffer 60 or the main memory 82 for status information. During interval B, the RDLC devotes its time to processing data; handling link 0, then link 1 and so on for all 16 links. Within each frame, each link handles one transmit and one receive data byte. The RDLC takes 6.48 microseconds to process both transmit and receive data for one link, requiring about 104 microseconds for all 16 links. During interval C, the RDLC reformatters do nothing except wait for the beginning of the next frame. This waiting period lasts approximately 16 microseconds. Therefore, the entire RDLC channel within each frame lasts approximately 125 microseconds.

Much of the activity on the RDLC takes place during the reformatting interval (Interval B). This interval is divided into 16 reformatting cycles. During each reformatting cycle, one byte of transmit data and one byte of received data is reformatted for one data link. During the 16 cycles data for each of the 16 data links is processed one data link per cycle. Therefore, the RDLC processes one transmit and one receive message byte per reformatting cycle for one data link. It stores any intermediate results in the scratch pad memory 83 and then proceeds to serve the next data link. Fetching intermediate results from the scratch pad memory, processing the data, and storing the next intermediate results and so on until the RDLC has served all 16 data links. The scratch pad memory 83 therefore provides storage for the transient state information (intermediate results) that is necessary to keep track of what each of the individual data links is doing. This information is updated once every frame or 125 microseconds.

With renewed reference to FIG. 4, a detailed explanation will be given for the transmit and receive reformatters. Transmit data from the PP is processed in the following manner. A message byte from the PP is loaded into the I/O buffer 60 and eventually transferred into the transmit read buffer (XRB) 91 via the I/O buffer bus 62 where it is available for further processing. The XRB provides an asynchronous interface between I/O buffer 60 and the transmit parallel to serial converter (XP2SC) 92. The XRB 91 ensures that data is always immediately available to the XP2SC 92 without any contention with PP accesses. The XRB 91 may be thought of as providing a look ahead or data prefetch for the XP2SC 92. Data left over from a previous reformatting cycle is loaded into XP2SC 92 from the scratch pad memory 83.

The remaining bits of a byte of data is transferred into XP2SC 92 from XRB 91. Simultaneously, the transmit bit counter in the bit and byte control counters 85 is reset to 0. Each time a bit is shifted out of the XP2SC 92, the transmit bit counter is incremented. When the transmit bit counter counts up to eight, it indicates that XP2SC 92 is empty and the above explained process repeats itself.

Data shifted out of XP2SC 92 is transferred to the transmit serial to parallel converter (XS2PC) 93 and horizontal and vertical parity is generated for them by HPG 94 and VPG 95 respectively. When seven data bits have been accumulated in the XS2PC 93 the contents of the HPG 94 is appended to the seven data bits to form an 8-bit byte which is transferred to the scratch pad memory 83 via the scratch pad bus 87. During channel 0 of the appropriate frame the data byte in the scratch pad memory 83 is written into the appropriate DCUOB 200, 201 and passed to the DCU and subsequently transmitted over the T1 carrier.

The inverse of this process takes place in the receiver reformatter. Data from the T1 carrier is stored in the DCU input buffer (DUCIB) from which it is transferred to the scratch pad memory 83 via bus 87. At the appropriate time this data is transferred to the receiver parallel to serial converter RP2SC 103. Horizontal parity checks and vertical parity checks are performed by the horizontally parity checker (HPC) 104 and the vertical parity checker (VPC) 105 before the data is transferred to the receiver serial to parallel converter RS2PC 102.

When eight data bits are accumulated in the RS2PC 102 they are transferred to the receive write buffer (RWB) 101 and then into the I/O buffer 60 via bus 62. The RWB 101 provides the same kind of asynchronous interface that the XRB 91 provides in the transmit section. The receive bit counter in the bit and byte control counter 85 keeps track of the number of data bits in the RS2PC 102. The above description covers the generation and reception of data bytes.

Idle pattern is generated by jamming the input of the XS2PC 93 to "1". The vertical parity byte is transmitted by selecting the vertical parity generator (VPG) 95 output as an input to the XS2PC 93.

The control byte is transmitted by disabling the XRB 91 outputs and loading the XP2SC with six bits of control data. The transmit bit counter is preset to a count of 2. When the six control bits have been shifted out the transmit bit counter will initiate the transfer of the first data byte into the XS2SC 93. The first data bit D0 will then be shifted out as part of the control byte.

Figure 6:
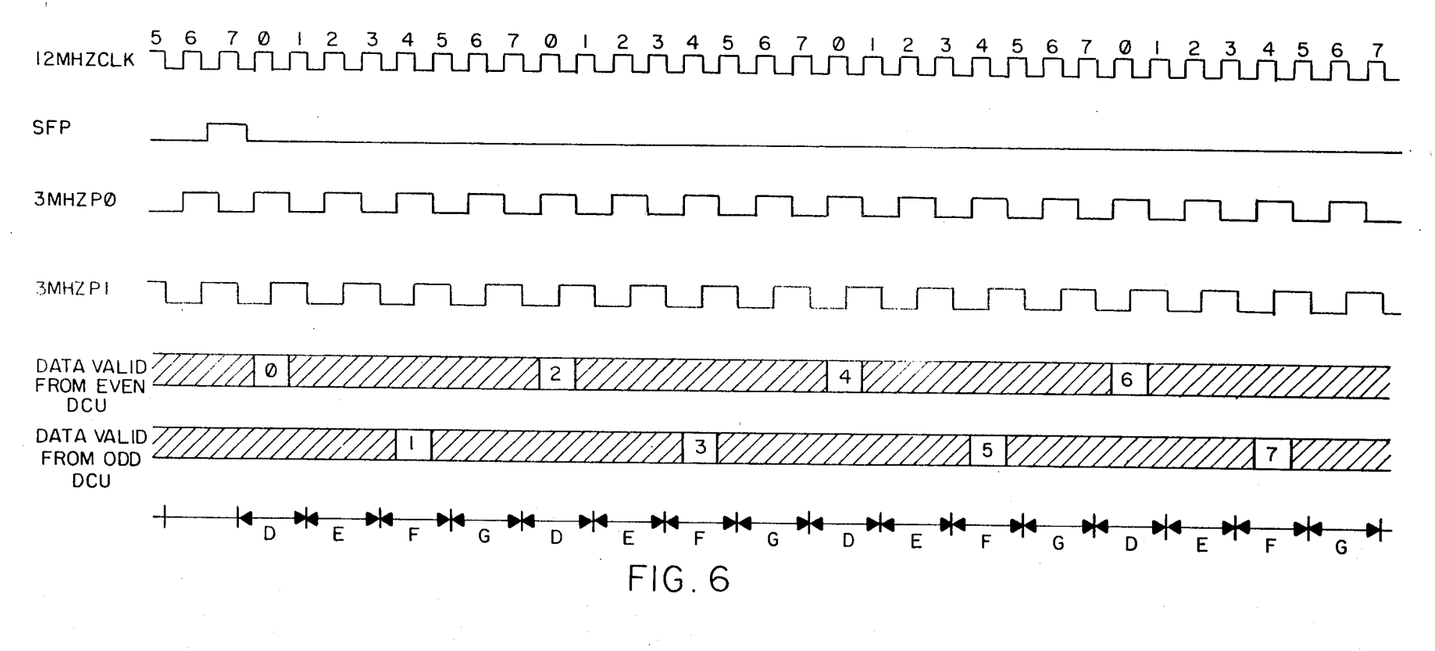
FIG. 6 is a timing diagram showing the transfer intervals, when the remote data link controller transfers and receives control data from the digital control unit output buffers.

Turning to FIG. 6 and FIG. 4, a closer look at the timing during interval A is shown. During interval D, data is valid from the even DCU and is transferred to the even DCU input buffer (DCUIB) 202. Simultaneously, a read access to the scratch pad memory 83 extracts the next output byte which is transferred to the even DCU output buffer (DCUOB) 200. During interval E, a received input byte from the even DCU input buffer DCUIB 202 is transferred to the scratch pad memory 83 for the appropriate data link. Simultaneously, the odd DCU will extract data from a DCU output buffer DCUOB 200 in preparation for transmitting it. During interval F, a transmitter output byte is transferred from the scratch pad memory 83 to the odd DCU output buffer DCUOB 200. Simultaneously, data is transferred from the odd DCU into the associated odd DCU input buffer DCUIB 203. During interval G, the even DCU takes data from its associated DCU output buffer DCUOB 200 in preparation for transmitting it. Simultaneously, a receive input byte from the odd DCU input buffer DCUIB 203 is transferred into the scratch pad memory 83.

During the transfer interval when the RDLC is transferring data to and from its associated DCUs, address sequencer 84 develops the addresses used to access the scratch pad memory 83.

Figure 7:
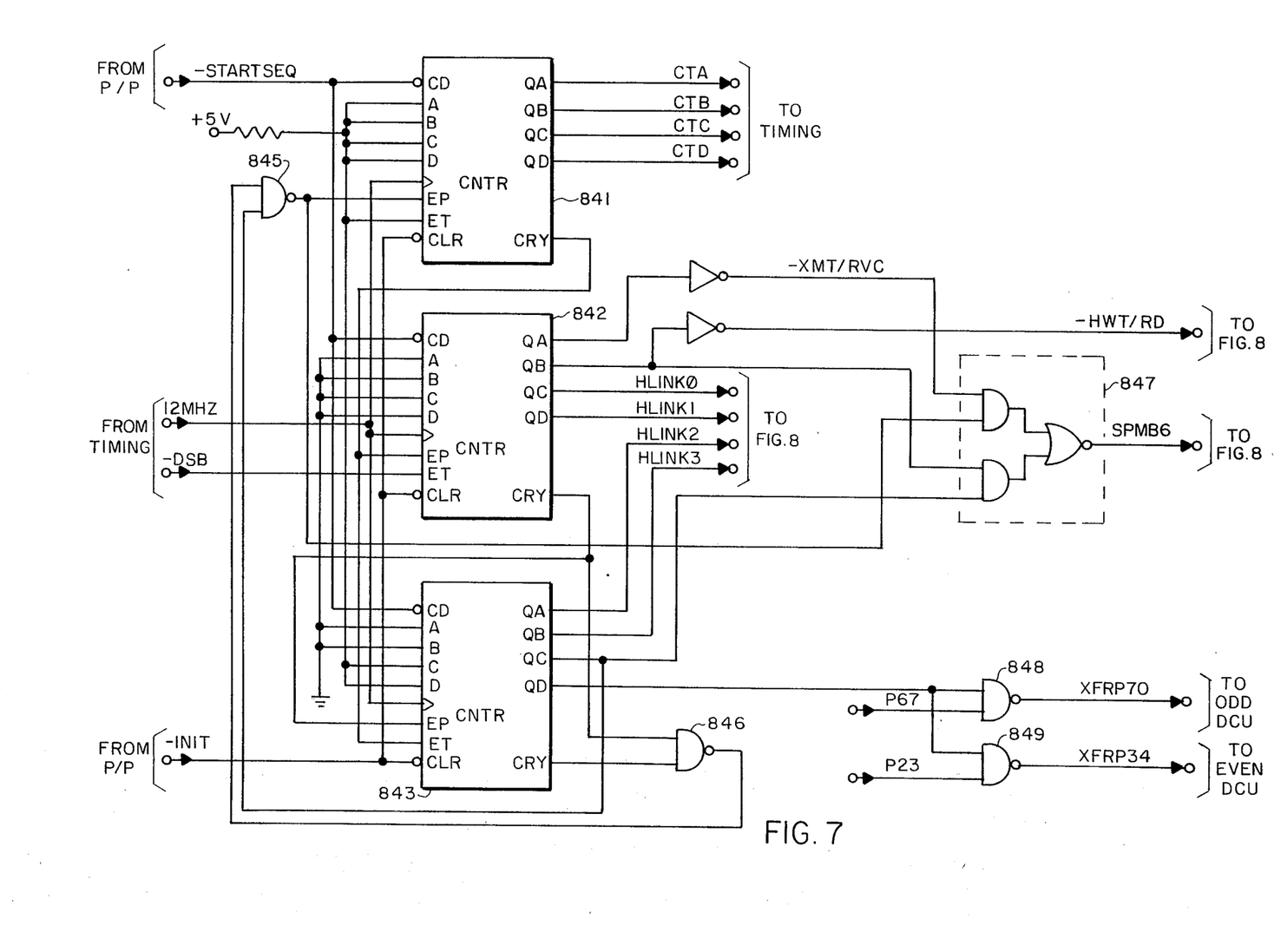
FIG. 7 is a detailed schematic of the address sequencer of the present invention.

Turning now to FIG. 7, a detailed schematic of the address sequencer of the present invention is shown. As can be seen, the sequencer is comprised of three counter circuits 841, 842 and 843. The counter circuits are each implemented by a synchronous 4-bit binary counter. The remainder of the circuit is comprised of gates 845 and 846, 848 and 849 and a 2 wide 2 input AND-OR-INVERT gate 847.

During the transfer interval counters 842 and 843 will be constantly enabled and will be incremented every 81 ns which generates a new address to the scratch pad memory via output lines HLINK0–HLINK3 every 324 ns. Counter 842 also develops signals XMT/RCV from its QA output and signal HWT/RD from its QB output.

Signal XMT/RCV is not used during the transfer interval while signal HWT/RD is used to develop one high order address bit for the scratch pad memory address.

The QD output of counter 843 will be high during the transfer interval enabling gates 848 and 849. In conjunction with timing signal P67, gate 848 outputs eight pulses via line XFRP70 to the odd DCU input buffers. Similarly, 849 in conjunction with timing signal P23 outputs eight pulses via line XFRP34 to the even DCU input buffers. Both of these signals enable their respective DCU input buffers allowing the transfer of received data bytes over the scratch pad bus 87 to the scratch pad memory 83.

As can be seen, each counter is loaded with a set count via the respective counters input lines A–D. Counter 843 is loaded with the binary number "1100," counter 842 with the binary number "0000" and 841 with the binary number "1111." These values are loaded into the counters by load signal −STARTSEQ which is developed in the link processor complex 81 from a systems framing pulse (SFP). The counters are clocked by a 12 MHz timing signal developed in the timing circuitry. Input signal −DSB is used to disable counters 842 and 843 allowing the link processor complex 81 to directly address the scratch pad memory 83.

The operation of the address sequencer is strongly affected by gates 845 and 846. During the idle period both inputs to gate 845 are a logic 1 making the output of gate 845 a logic 0 and disabling counter 841. Because the carry output of counter 841 is a logic 0 during the idle interval, counters 842 and 843 will not count. Therefore, during the idle interval the entire address sequencer stops counting and remains idle.

The idle interval ends when signal −STARTSEQ goes low, loading the counters with the set binary value "1100 0000 1111." This marks the beginning of the transfer interval. During this time, counter 841 is still disabled by the logic 0 output of gate 845. Since counter 841 was loaded with binary value "1111" its carry output is high enabling counters 842 and 843 which increment every 81 nanoseconds. After 64 clock pulses, the sequencer reaches a binary value of "1111 1111 1111." At which time the inputs to gate 846 are both a logic high making the output a logic 0. The logic 0 is applied to the input of gate 845 which outputs a logic 1 enabling counter 841.

After the 64th clock pulse the sequencer enters the reformatting interval. During the reformatting interval the QC output of counter 843 is low ensuring that counter 841 will be continuously enabled. As a consequence, counters 842 and 843 increment much more slowly than they did during the transfer interval. It should be noted that for every four times counter 842 is incremented, the −DSB signal will go low, disabling counter 842 for a period of 1.296 microseconds. In other words counter, 842 is only incremented on four out of every five carry outs coming from counter 841. It is only during this 1.296 microsecond period when −DSB is low that the link processor complex 81 has access to the contents of the scratch pad memory. When counter 843 reaches a count of binary "0111" the QC output goes high making the outputs of gate 845 a logic low; disabling counter 841. At this time the address sequencer enters the idle interval and remains idle until the next −STARTSEQ pulse.

AND-OR-INVERT gate 847 functions as a 2/1 multiplexer arranged so that during the transfer period its output is −HWT/RD which is used to develop one of the scratch pad memory address bits.

Figure 8:
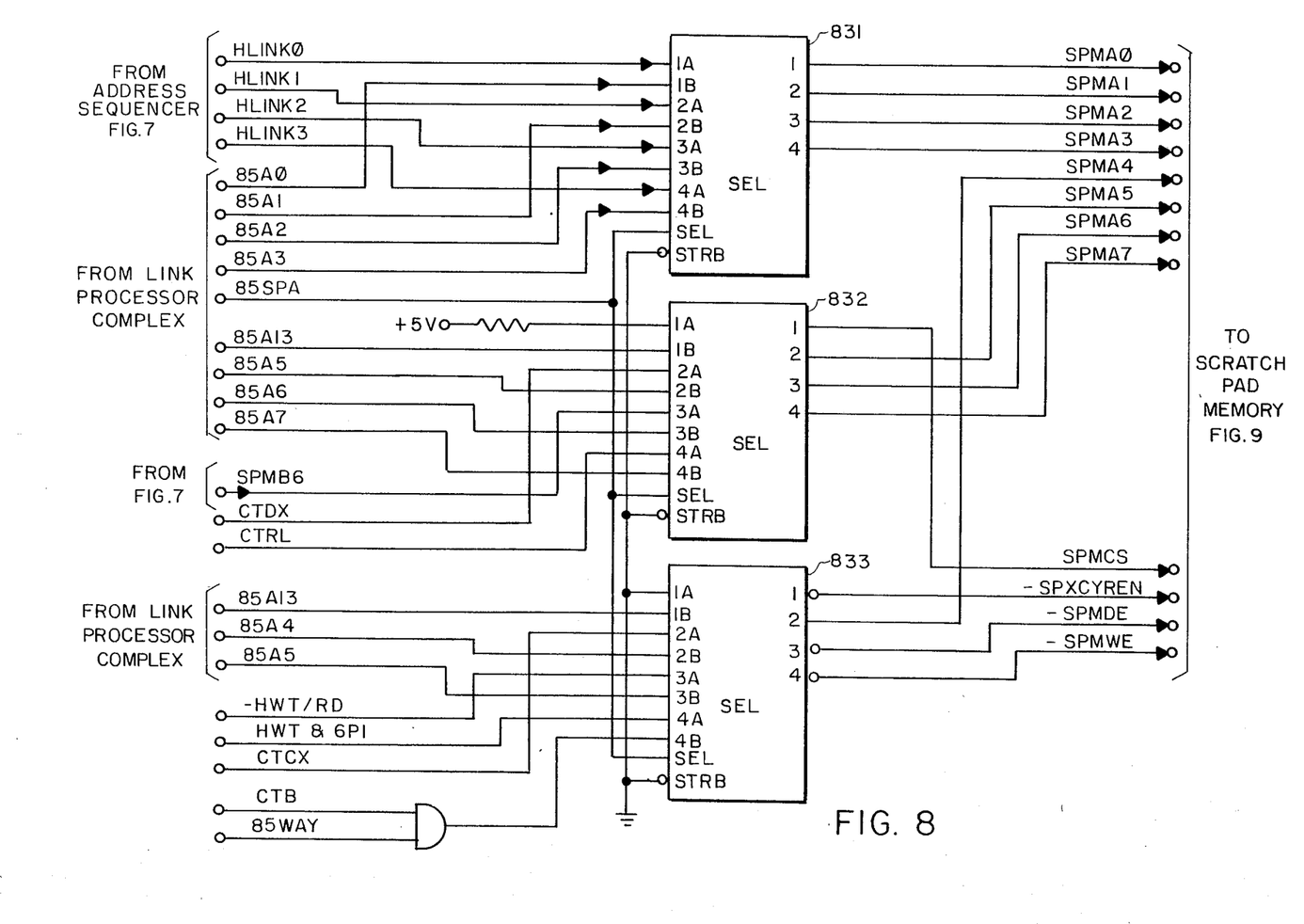
FIG. 8 is a detailed schematic of the address selector for the scratch pad memory of the present invention.
Figure 9:
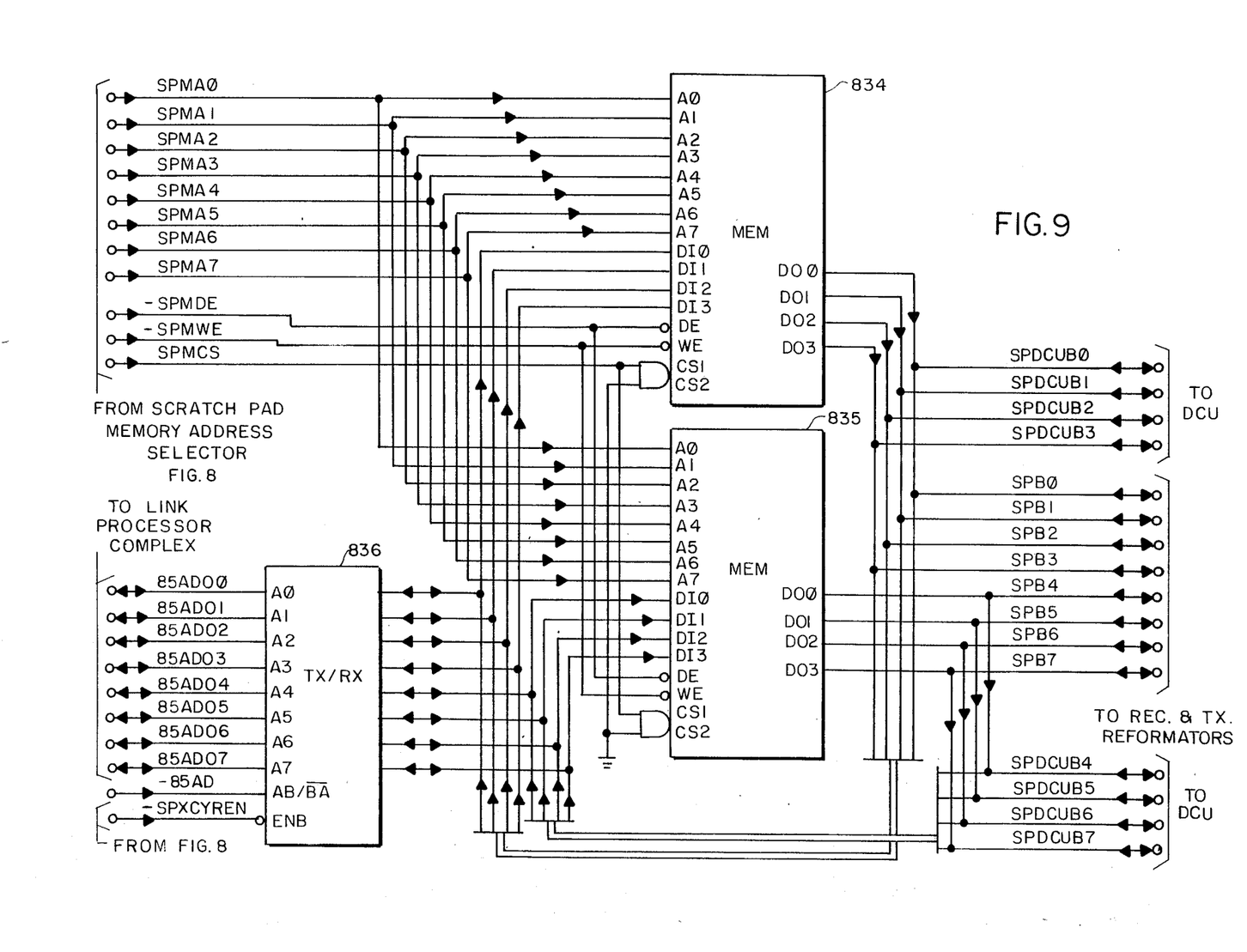
FIG. 9 is a detailed schematic of the scratch pad memory of the present invention.

Turning now to FIGS. 8 and 9, the scratch pad memory address selector circuit and scratch pad memory circuit respectively is shown. The scratch pad memory address selector circuit is comprised of data selectors 831 and 832 each implemented by a quad 2/1 data selector/multiplexer and a selector 833 implemented with a quad 2/1 data selector/multiplexer inverter.

The outputs of the data selectors 831, 832 and 833 select the address and control signals used to acces the scratch pad memory 83. The scratch pad memory 83 is comprised of memory circuits 834 and 835 which are 256×4 bit devices. Finally, the memory circuit includes a data transceiver 836 which controls data to/from the link processor complex 81 via the link processor data bus lines 85AD00-85AD07.

Since the scratch pad memory circuits 834 and 835 can be either addressed from the address sequencer 84, or by the link processor complex 81, data selectors 831, 832 and 833 select the final address used to read or write data to memories 834 and 835.

As can be seen in FIG. 8, the four low order address bits SPMA0-SPMA3 are developed by selecting either HLINK0-HLINK3 inputs or the 85A0-85A3 inputs to data selector 831. Input signals 85A0-85A3 are the four low order address bits from the address bus of the link processor complex 81. The fifth address bit SPMA4 is selected between signal 6PI which is a timing signal from timing circuit 86 or 85A4 from the link processor complex 81. The three high order address bits SPMA5-SPMA7 are selected from either the link processor address bus 85A5-85A7 signals resepctively or from signals CTDX, SPMB6 and CTRL. It should be noted that signal SPMB6 is the output of the AND-OR-INVERT circuit 847 of the address sequencer. Signal CTDX and CTRL are developed in the timing circuit 86 of the RDLC.

Control signals —SPXCYREN, —SPMDE, —SPMWE are selected by data selector 833 from the inputs shown. Control signal SPMCS is selected by data selector 832 from either a +5 v source or address line 85A13.

Input signal 85SPA which is applied to the select input of data selectors 831, 832 and 833 is developed in the link processor complex 81. During the 1.296 microseconds when the link processor has control of the scratch pad memory this signal is a logic high. As explained previously this signal is only high during the reformatting period.

Figure 10:
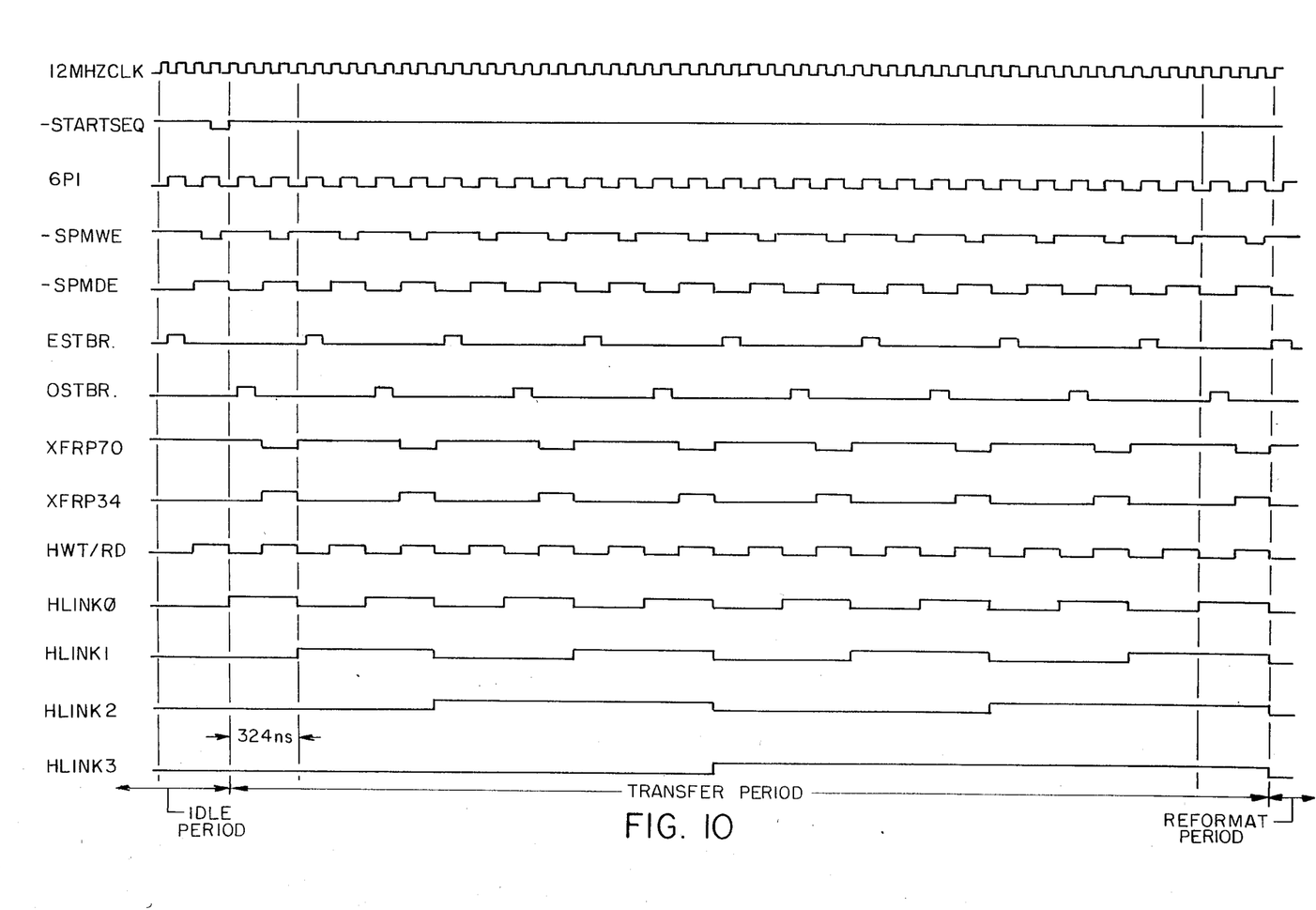
FIG. 10 is a timing diagram showing the control signals used in the address sequencer and scratch pad memory of the present invention.

Turning now to FIG. 10 with reference to FIGS. 8 and 9, the operation of writing and reading memories 834 and 835 during the transfer interval will now be given. The DCUIB and DCUOB of each data link is accessed during a 324 ns period, i.e. during the first 324 ns period link 0 is accessed, during the second 324 ns period link 1, etc. Additionally, each 324 ns period is split into two 162 ns halves where during the first half the DCUIB is accessed and during the second half the DCUOB is accessed. Sixteen links are accessed in this manner during the transfer interval taking a total of approximately 5.184 microseconds to complete the transfer of all data bytes between the scratch pad memory and the data links.

The transfer interval is initiated by pulse —STARTSEQ at which time counters 842 and 843 begin their count. Formatted data bytes stored in the scratch pad memory ready for transmission are transferred to the DCUOB and the latest received data byte in the DCUIB is transferred to the scratch pad memory for link 0 during this first 324 ns period. At this time as can be seen in FIG. 10 the four low ordered address bits HLINK0-HLINK3 have a binary value of "0000." Signal HWT/RD which is used to develop bit 6 of the scratch pad memory address is also a logic "0" accessing the memory location in the scratch pad memory 834 and 835 where the link 0 output data byte is stored. Simultaneously, an ESTBR signal developed in the timing circuit is applied to the even DCUOB enabling that buffer. Signal —SPMDE goes low allowing the addressed data byte to be read out of memories 834 and 835 and transferred to the even DCUOB via bus lines SPDCUB0-SPDCUB7. The data output byte from the scratch pad memory is subsequently transferred from the even DCUOB to the DCU and transmitted to the distant end of the link. In the last 162 ns half of link 0 signal HWT/RD goes high addressing the memory location where the receive data byte for link 0 will be stored. Simultaneously, signal XFRP34 goes low enabling the even DCUIB which transfers the most recently received data byte to the scratch pad bus. Signal —SPMWE writes the data byte presented on bus lines SPDDCUB0-SPDDCUB7 into the scratch pad memory 834 and 835. Therefore, it can be seen that two distinct locations in the scratch pad memory for each link is used for the reading and writing of data during the transfer interval.

During the next 324 ns period data transfer will be done for link 1. Counter outputs HLINK0-HLINK3 have a value of binary "0001" and HWT/RD (bit 6) a value of logic 0 addressing the memory location where the link 1 transmit data byte is stored. Simultaneously, signal OSTBR is developed in the timing circuitry and used to enable the odd DCUOB. Signal —SPMDE goes low which outputs the data byte addressed to the odd DCUOB via lines SPDCUB0-SPDCUB7. During the last half of the link 1 transfer period, HWT/RD (bit 6) of the scratch pad memory address goes high. Simultaneously, the XFRP70 signal goes low enabling the odd DCUIB transferring the latest received data byte for link 1 to the scratch pad bus. Signal —SPMWE goes low writing the data byte on bus lines SPDCUB0-SPDCUB7 to memory 834 and 835. The data byte is written into the memory location addressed by HWT/RD and HLINK0-HLINK3.

This procedure is repeated 16 times once for each link. It should be noted that bits 4, 5 and 7 of the scratch pad memory address are also used to develop the address but have been left out here for ease of explanation.

As long as control signal 85SPA is a logic "0" the address sequencer 84 increments developing the addresses used for reading and writing data bytes from the scratch pad memory to the associated DCU and from the DCU to the scratch pad memory. Accesses to the information in the scratch pad memory 83 from the link processor complex 81 is enabled only when input signal 85SPA is a logic "1" and only during the reformatting interval.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An address sequencer and memory arrangement used in a remote data link controller for transferring data in the form of message bytes to a plurality of digital data links, said remote data link controller including a link processor complex for controlling said remote data link controller, a message byte formatter for assembling data words into message bytes and at least one data link input buffer and at least one data link output buffer connected to said plurality of digital data links, said address sequencer and memory arrangement comprising:

memory means including a plurality of memory location areas, each memory location area associated with one of said plurality of digital data links, said memory means arranged to be connected to said data link input buffer or alternatively to said message byte formatter wherein, said memory means receives and stores in each memory location a message byte from said message byte formatter; and counter means connected to said memory means arranged to have a preset count loaded into said counter means responsive to a start pulse from said link processor complex whereby, said counter means increments and outputs to said memory means addresses which sequentially access each of said memory location areas and said data link input buffer writes a message byte in each memory location area from a respective one of said plurality of digital data links and alternatively, each of said memory locations is sequentially accessed thereby transferring each message byte stored in said memory means to said data link output buffer for the transmission of each message byte over a respective one of said plurality of digital data links.

2. An address sequencer and memory arrangement as claimed in claim 1, wherein: said memory means includes at least two 256×4 memory circuits and each of said memory circuits include a plurality of bidirectional data lines, said plurality of bidirectional data lines connected to said message byte formatter and said digital data link output buffer.

3. An address sequencer and memory arrangement as claimed in claim 1, wherein: said counter means comprises a plurality of synchronous 4-bit binary counters connected to a source of clock pulses and said plurality of synchronous 4-bit binary counters are loaded with the binary value "1100 0000 1111" responsive to said start pulse whereby, said plurality of synchronous 4-bit binary counters increment for 64 clock pulses reaching a binary value of "1111 1111 1111".

4. An address sequencer and memory arrangement as claimed in claim 3, wherein: said plurality of synchronous 4-bit binary counters comprises three 4-bit binary counters and there is further included at least one NAND gate controlling a first 4-bit binary counter, said NAND gate normally having a logic low output which is input to said first 4-bit binary counter disabling said first 4-bit binary counter whereby, responsive to said start pulse a second and a third 4-bit binary counter increment for said 64 clock pulses.

5. An address sequencer and memory arrangement as claimed in claim 4, wherein: said NAND gate output is a logic high when said second and third 4-bit binary counters reach said binary value of "1111 1111 1111" enabling said first binary counter.

6. An address sequencer and memory arrangement as claimed in claim 4, wherein: said counter means further includes an input buffer enabling circuit comprised of at least one NAND gate said NAND gate having one of its inputs connected to said third binary counter and a second input connected to a remote data link controller timing circuit whereby, said input buffer enabling circuit periodically outputs to said data link input buffer a data link input buffer enabling signal when said second and third 4-bit binary counters increment.

7. An address sequencer and memory arrangement as claimed in claim 1, wherein: said address sequencer and memory arrangement further includes an address selector connected to said counter means and said link processor complex, said address selector arranged to output to said memory means addresses developed by said counter means or alternatively addresses developed by said link processor complex.

8. An address sequencer and memory arrangement as claimed in claim 7, wherein: said address selector is comprised of a plurality of 2/1 multiplexers and each multiplexer is connected to said counter means and to said link processor complex and each multiplexer connects said memory means to said counter means or alternatively to said link processor complex responsive to a select signal developed by said link processor complex.

9. An address sequencer and memory arrangement as claimed in claim 1, wherein: said remote data link controller further includes reformatter means arranged to receive said message bytes from said memory means, said reformatter means assembling said message bytes into data words and said memory means includes at least two 256×4 memory circuits, each of said memory circuits including a plurality of bidirectional data lines and each bidirectional data line is connected to said reformatter means for transfer of said message bytes to said reformatter means and alternatively to said data link input buffer for transfer of message bytes to said memory circuits.

* * * * *